(12) United States Patent
Liu et al.

(10) Patent No.: US 7,480,221 B2
(45) Date of Patent: Jan. 20, 2009

(54) METHOD FOR GENERATING CONTROL PARAMETERS FOR OPTIMUM WRITE POWER AND APPARATUS THEREFOR

(75) Inventors: Yuan-Chin Liu, Hsin-Chu (TW); Ming-Yang Chao, Hsin-Chu Hsien (TW)

(73) Assignee: Mediatek Inc., Hsin-Chu (TW)

( * ) Notice: Subject to any disclaimer, the term of this patent is extended or adjusted under 35 U.S.C. 154(b) by 871 days.

(21) Appl. No.: 11/092,765

(22) Filed: Mar. 30, 2005

(65) Prior Publication Data
US 2005/0265182 A1    Dec. 1, 2005

(30) Foreign Application Priority Data
May 28, 2004    (TW)    ............... 93115330 A (51) Int. Cl.
G11B 7/00    (2006.01)
(52) U.S. Cl. ............ 369/47.53; 369/53.22; 369/59.11; 369/59.21; 369/116
(58) Field of Classification Search ...... 369/47.5–47.53, 369/59.11, 100, 116
See application file for complete search history.

(56) References Cited

U.S. PATENT DOCUMENTS

| | | | |
|---|---|---|---|
| 6,768,711 B2 * | 7/2004 | Ueki | 369/275.1 |
| 6,798,728 B2 * | 9/2004 | Ota et al. | 369/116 |
| 2002/0172114 A1 * | 11/2002 | Shimizu et al. | 369/47.51 |
| 2003/0227844 A1 * | 12/2003 | Chen et al. | 369/47.51 |

* cited by examiner

Primary Examiner—Marvin M Lateef
Assistant Examiner—Jesse Hauck
(74) Attorney, Agent, or Firm—Thomas, Kayden, Horstemeyer & Risley (57) ABSTRACT

In a method and apparatus for generating optimum write power, a control unit controls a write voltage generating unit to generate sequentially write voltages of different levels to drive an optical read/write head to generate different write powers so as to write data on a plurality of write intervals of an optical recording medium in sequence. Simultaneously, a detecting and computing circuit detects a peak value, a first level and a second level of a write reflected signal generated by each write interval for computation so as to obtain a first control parameter of each write interval, and detects a peak value, a bottom value and a direct current level of a read reflected signal generated during reading of each write interval for computation so as to obtain a second control parameter of each write interval, thereby generating an optimum write power based on optimal first and second control parameters.

20 Claims, 7 Drawing Sheets

METHOD FOR GENERATING CONTROL PARAMETERS FOR OPTIMUM WRITE POWER AND APPARATUS THEREFOR

CROSS-REFERENCE TO RELATED APPLICATION

This application claims priority of Taiwanese Application No. 093115330, filed on May 28, 2004.

BACKGROUND OF THE INVENTION

1. Field of the Invention

The invention relates to a method and apparatus for generating optimum write power, more particularly to a method of using hardware circuits to execute and control an optimum write power generating process and to automatically employ a series of powers to perform interval-wise test recording so as to obtain parameters of characteristics of the recording power of each interval to thereby determine the optimum write power, and an apparatus therefor.

2. Description of the Related Art

In an optical recording system, an optical read/write head is mainly used to produce a laser beam. The laser beam is a write signal generated as a result of modulation of digital data to be recorded so as to form light readable pits that represent digital data on an optical disk to be recorded. Therefore, the laser power of the write signal becomes one of the important factors that determine the recording quality of the optical disk. Thus, how to control the optical read/write head to output the optimum write laser power becomes an important technique in the field of optical storage techniques.

At present, conventional optimum write power generating methods mainly fall into two types. One is the pre-recording optimum power control (OPC) technique, in which an optical recording system uses a series of write powers (i.e., a plurality of different write powers) to perform a recording test (test recording) in a predetermined test area of the optical disk before proceeding with the actual recording, and to subsequently obtain a read reflected (RRF) signal by reading light readable pits recorded on the test area. Each of the read reflected signals is analyzed and determined so as to select therefrom a write power that produces the best recording quality (i.e., generating the optimum light readable pits) for performing the actual data recording on the optical disk.

The other is the running optimum power control (ROPC) technique, in which the optical recording system, during the actual recording process, acquires a write reflected (WRF) signal generated by a write signal and, after analysis and determination of the same, generates in real time an optimum write power to replace the previous write signal, thereby enabling the optical recording system to always maintain the optimum recording quality during the recording process.

Whether it is the OPC technique or the ROPC technique, either will generate some relevant parameters representing the quality of the write power when the RRF signal and the WRF signal are analyzed and computed. For instance, the OPC technique will generate $\beta$ parameters, and the ROPC technique will generate $\alpha$ parameters. Therefore, the optical recording system may select the pre-recording or running optimum write power based upon these parameters. Thus, if there are good OPC and ROPC process control and good parameter computing methods, optimum control of the write power of the optical storage device can be achieved.

However, in the traditional OPC execution procedures, a microprocessor built in the system uses a software program to control operation of the existing memory and I/O addresses to continuously generate a plurality of write voltages of different levels, and to drive the optical read/write head to generate a plurality of different write laser powers to perform test recording on a test area of the optical recording medium in sequence, followed by reading of the light readable pits recorded on the test area so as to obtain a plurality of corresponding read reflected (RRF) signals. Based on the RRF signals, an optimum control parameter $\beta$ is obtained, and an optimum write laser power is generated based thereon. Therefore, the microprocessor needs to spend a considerable amount of time in computing the OPC values. However, in addition to performing OPC control, the microprocessor also needs to perform synchronous control of other servo mechanisms in the optical recording system, e.g., the motor rotational speed, the focus and track-locking of the optical read/write head, encoding, etc., so that the microprocessor is overloaded and cannot produce a good working efficiency, and cannot quickly generate the optimum write power control parameters required by OPC.

In addition, in the current optical recording system, the microprocessor is not equipped with both OPC control and ROPC control. That is, the microprocessor can only select using one of OPC control and ROPC control. Therefore, the microprocessor cannot execute ROPC to obtain the control parameter $\alpha$ when executing OPC (to generate the control parameter $\beta$).

Accordingly, how to reduce the workload of the microprocessor, how to establish a quick and automatic OPC procedure executing mechanism, and how to simultaneously carry out ROPC during the process of executing the OPC procedure so as to obtain the optimum write power control parameters have become the technical emphasis of this invention.

SUMMARY OF THE INVENTION

Therefore, an object of this invention is to provide a method and apparatus for generating control parameters for optimum write power, which replaces the OPC control procedure of a microprocessor, which permits automatic and quick execution of the OPC procedure, and which enables the ROPC procedure to be performed simultaneously with the execution of the OPC procedure, so that relevant control parameters for determining the optimum write power can be obtained.

Accordingly, the method for generating control parameters for optimum write power is for use in an optical recording system which controls an optical read/write head thereof to generate an optimum write laser power based on the control parameters so as to perform data recording on an optical recording medium. The method includes: (a) generating in sequence a plurality of write voltages of different levels to drive the optical read/write head to generate different write laser powers so as to record data on a plurality of continuous write intervals of the optical recording medium in sequence; (b) during recording of each of the write intervals, detecting a peak value, a first level and a second level of a write reflected signal generated by each of the write intervals and performing an arithmetic operation so as to obtain a first control parameter of each of the write intervals; and (c) reading the write intervals in sequence, and after detecting a peak value, a bottom value, and a direct current level of a read reflected signal generated by each of the write intervals when being read, performing an arithmetic operation so as to obtain a second control parameter of each of the write intervals.

Furthermore, an apparatus for generating control parameters for optimum write power for realizing the aforesaid method of this invention is for use in an optical recording system to control an optical read/write head thereof to generate an optimum write laser power based on the control parameters to perform data recording on an optical recording medium. The apparatus includes a write voltage generating unit, a control unit, and a detecting and computing unit. The write voltage generating unit is connected to the optical read/write head for generating a write voltage to drive the optical read/write head to correspondingly output a write laser power. The control unit is connected to the write voltage generating unit for controlling the write voltage generating unit to generate a plurality of write voltages of different levels so as to drive the optical read/write head to generate different write laser powers to thereby record data on a plurality of continuous write intervals of the optical recording medium. The detecting and computing unit is connected to the optical read/write head, is controlled by the control unit to detect a peak value, a first level, and a second level of a write reflected signal generated by each of the write intervals of the optical recording medium during recording and to perform an arithmetic operation so as to obtain a first control parameter of each of the write intervals, and is controlled by the control unit to detect a peak value, a bottom value and a direct current level of a read reflected signal generated by each of the write intervals when being read and to perform an arithmetic operation so as to obtain a second control parameter of each of the write intervals.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
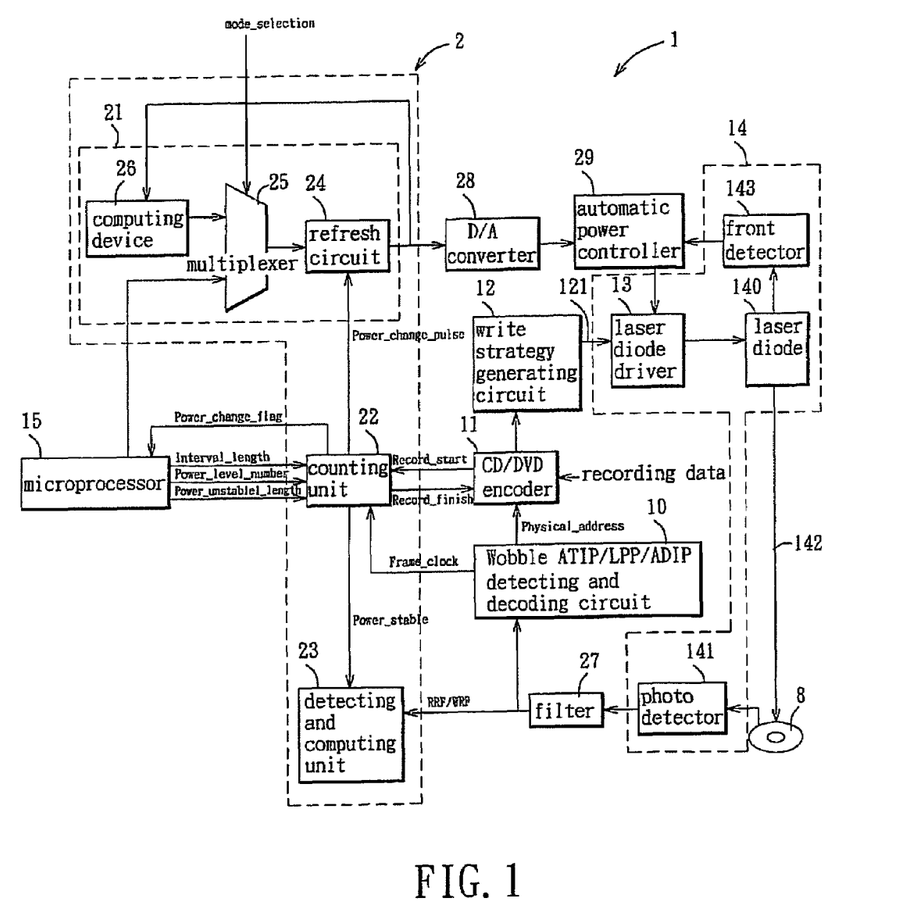
FIG. 1 is a circuit block diagram of a preferred embodiment of an apparatus for generating control parameters for optimum write power according to this invention.

Referring to FIG. 1, a preferred embodiment of an apparatus for generating control parameters for optimum write power according to this invention is shown to be applied to an optical recording system 1. In this embodiment, the optical recording system 1 primarily includes conventional circuit structures such as a wobble ATIP/LPP/ADIP(Absolute Time In Pregroove/Land PrePit/Address In Pregroove) detecting and decoding circuit 10, a CD/DVD encoder 11, a write strategy generating circuit 12, an optical read/write head 14 and a microprocessor 15, and an optimum write power control parameter generating apparatus 2 of this invention.

The optical read/write head 14 includes a laser diode (LD) driver 13, a laser diode 140, a photo detector (PD) 141, and a front detector (FD) 143.

The apparatus for generating control parameters for optimum write power (hereinafter referred to as control parameter generating apparatus 2) is an OPC (pre-recording optimum power control) flow control circuit, which includes a write voltage generating unit 21, a control unit 22, and a detecting and computing unit 23.

The write voltage generating unit 21 in this embodiment further includes a refresh circuit 24, a multiplexer 25, and a computing device 26. The refresh circuit 24 is connected to the control unit 22. The multiplexer 25 is a 2×1 (2 in, 1 out) multiplexer, with an input end thereof connected to the computing device 26 and the microprocessor 15, respectively, and an output end connected to the refresh circuit 24. Furthermore, the multiplexer 25 may be controlled by a mode selection signal mode_selection to select one of the computing device 26 and the microprocessor 15 as its input source. The invention will be described below with the computing device 26 selected as the input source of the multiplexer 25.

Before the optical recording system 1 performs a recording operation, the control parameter generating apparatus 2 will be activated first to proceed with the OPC procedure. At this time, referring to step 31 in FIG. 2, the microprocessor 15 will make a series of relevant settings against the control unit 22, including setting a write interval length (Interval_length), a power level number (Power_level_number), and a power unstable length (Power_unstable_length) in the control unit 22, setting an initial write voltage value Level_1 in the refresh circuit 24 of the write voltage generating unit 21, and presetting a power increasing/decreasing value Δ in the computing device 26. The power level number Power_level_number indicates the number of changes of the write voltage level.

Subsequently, the optical recording system 1 causes the optical disk 8 to start rotation, and simultaneously causes the laser diode 140 of the optical read/write head 14 to output a read laser beam to read the absolute position information preformed on the optical disk 8 (the absolute position information preformed on different disks is different, e.g., the Wobble ATIP on CD-R/RW, the Wobble LPP on DVD-R/RW, and the Wobble ADIP on DVD+R/RW, etc.). At this time, the photo detector 141 on the optical read/write head 14 detects that the read laser beam generates a read reflected signal (hereinafter referred to as the RRF signal), which is filtered by a filter 27 and is subsequently sent to the Wobble ATIP/LPP/ADIP detecting and decoding circuit 10 so as to acquire from the RRF signal the ATIP/LPP/ADIP information recorded thereon for decoding, thereby obtaining a physical address (Physical_address) of the optical disk 8 to serve as a positioning basis for starting the recording operation.

Furthermore, during the process of data recording, the laser diode 140 of the laser read/write head 14 outputs a write laser beam to perform recording on the optical disk 8. At the same time, the write reflected signal (hereinafter referred to as the WRF signal) generated as a result of reflection of the optical disk 8 is detected by the photo detector 141 of the optical read/write head 14 and, after being filtered by the filter 27, is sent to the Wobble ATIP/LPP/ADIP detecting and decoding circuit 10 so as to acquire the ATIP/LPP/ADIP information recorded thereon for decoding, thereby obtaining a frame clock Frame_clock to serve as the basic unit of write recording length. Besides, the aforesaid write interval length Interval_length uses the frame clock Frame_clock as the counting unit. For example, each write interval length has 8 frames. In a DVD, one frame=1488T, whereas in a CD, one frame=588T.

Figure 2:
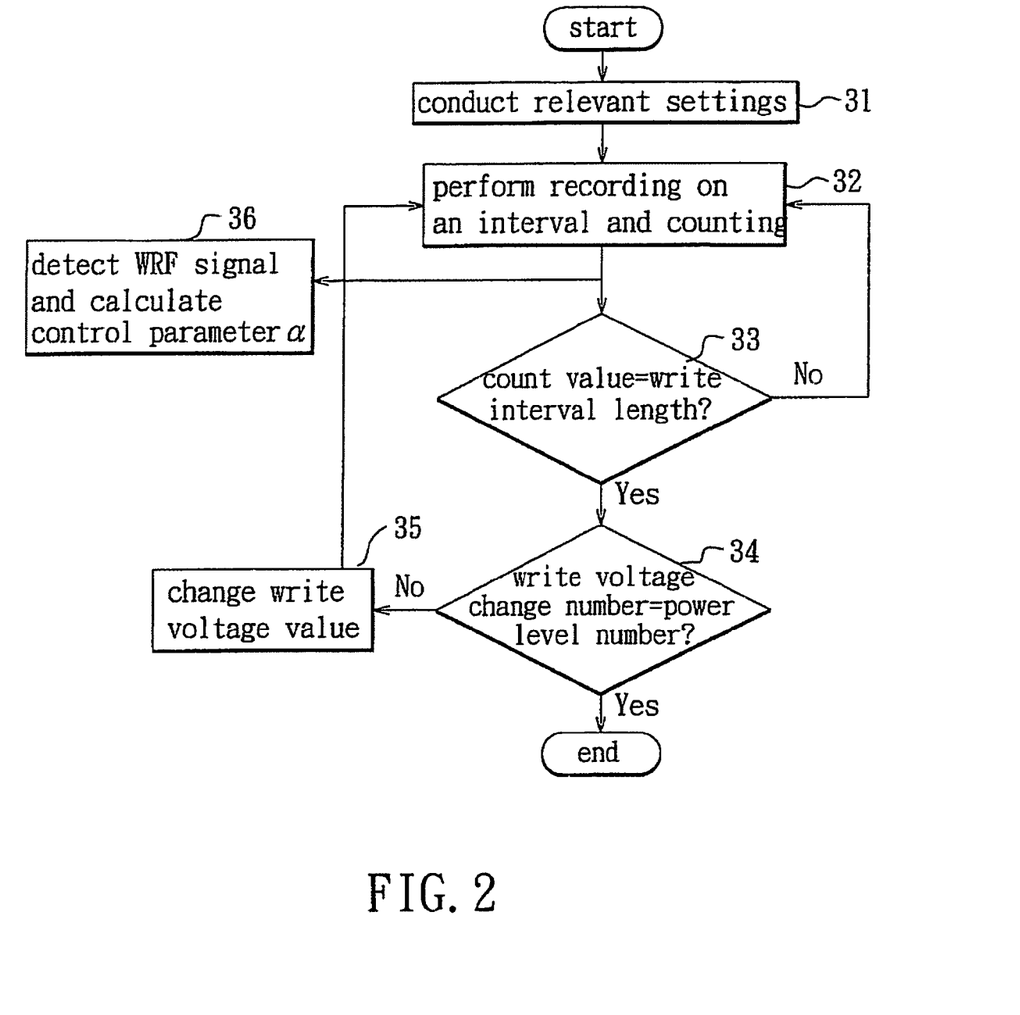
FIG. 2 is a flow chart of a recording process when the preferred embodiment executes the OPC procedure.
Figure 3:
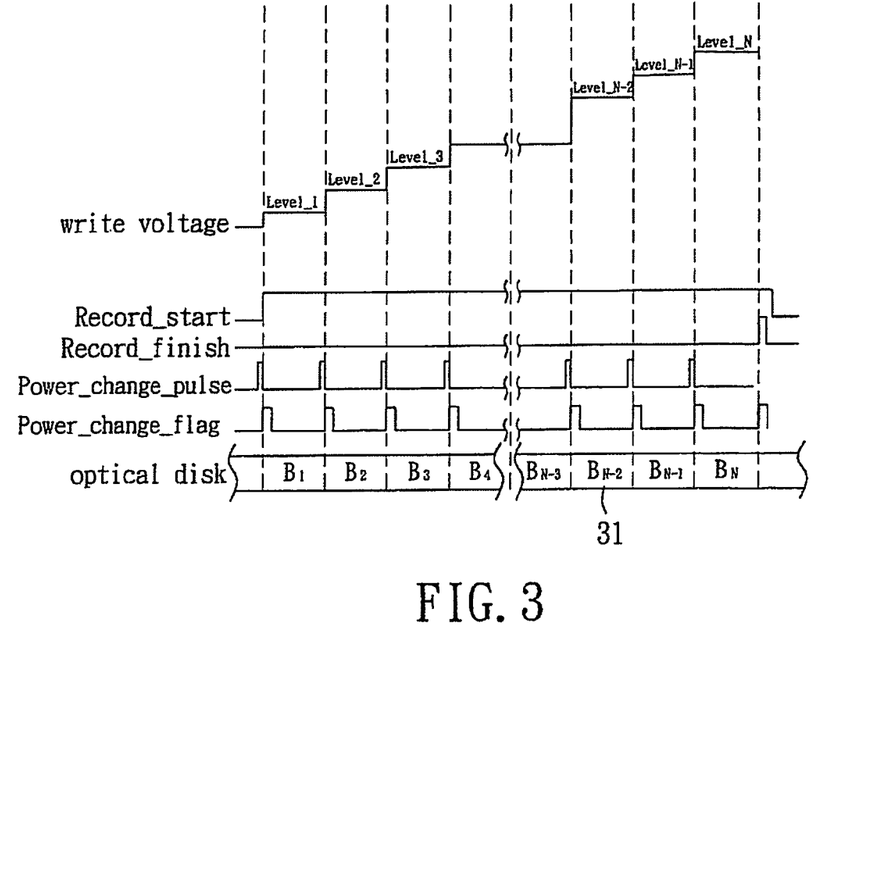
FIG. 3 is a time chart of the recording process when the preferred embodiment executes the OPC procedure.

Therefore, when the optical read/write head 14 moves to a record start position (i.e., the starting point in the test area 31 as shown in FIG. 3) of the optical disk 8, as shown in step 32 of FIG. 2, the CD/DVD encoder 11 sends a record start signal Record_start signal to the control unit 22 to enable it to issue a power change pulse Power_change_pulse so as to trigger the refresh circuit 24 of the write voltage generating unit 21 to send the initial write voltage value Level_1 to a D/A converter 28 for conversion into an analog write voltage Level_1, which is sent by an automatic power controller (APC) 29 to the laser diode driver 13.

Figure 4:
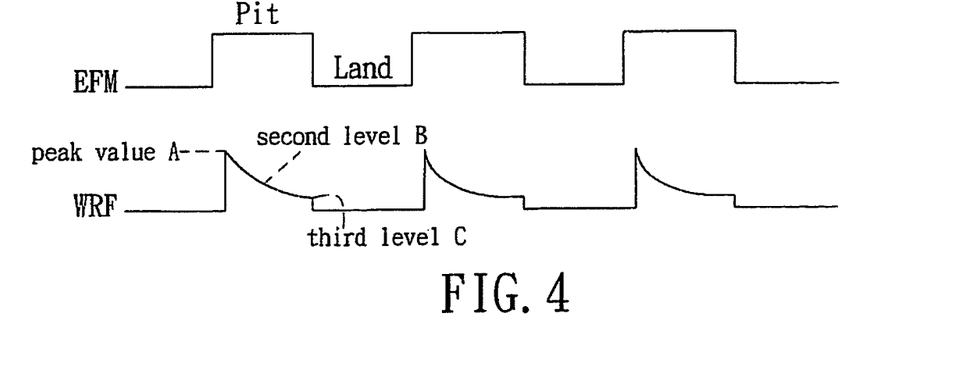
FIG. 4 shows waveforms of recorded data (EFM signal) and a WRP signal of the preferred embodiment.

At the same time, the CD/DVD encoder 11 sends recording data (which is an EFM signal including a pit area (recording) and a land (blank) area, as shown in FIG. 4) that has been prepared in advance to the write strategy generating circuit 12 so as to generate a write power switch signal 121 to control the laser diode driver 13 to output an electric current for driving the laser diode 140 on the optical read/write head 14 to output a write optical signal (i.e., a write laser beam) 142 which has been modulated by the write power switch signal 121, and to carry out recording on a first interval B1 of the test area 31 of the optical disk 8 shown in FIG. 3. In addition, the write voltage value Level_1 is simultaneously inputted into the computing device 26 by the refresh circuit 24, and is computed with the power increasing/decreasing value Δ (e.g., by addition or subtraction, so that the write voltage has the propensity to increase or decrease. Then, a second write voltage value Level_2 is outputted for storage in the refresh circuit 24.

At the same time, the control unit 22 starts to count the length of the first interval B1 based on the frame clock frame_clock, and determines whether the count value reaches a predetermined length (i.e., the 8 frames of the write interval length) of the first interval B1, as in step 33 shown in FIG. 2. When the count value has reached the predetermined length of the first interval B1, this indicates that the predetermined record length of the write voltage Level_1 has been completed, and that another write voltage value should be generated to perform recording on a next interval (i.e., the second interval B2). Thus, in step 34 as shown in FIG. 2, the control unit 22 will first determine whether the write voltage change number has reached the power level number Power_level_number. Then, step 35 shown in FIG. 2 is performed and, as shown in FIGS. 1 and 3, the control unit 22 issues a power change pulse Power_change_pulse to trigger the refresh circuit 24 to output a second write voltage value Level_2 to the laser diode driver 13 (which is also outputted to the computing device 26 so that after the second write voltage value Level_2 and the power increasing/decreasing value A are computed, a third write voltage value Level_3 is outputted for storage in the refresh circuit 24) to drive the laser diode 140 to generate a second write power to record data on the second interval B2 of the optical disk 8. The control unit 22 will also start counting anew. The aforesaid steps 32~35 are executed repeatedly until the last write interval of the optical disk 8 has been written to so as to perform recording on the first to fifteen continuous intervals B1~B15 of the optical disk 8 at write powers generated by different write voltages Level_1-level_15. Then, the control unit 22 issues a record finish signal Record_finish to notify the CD/DVD encoder 11 of the end of the data recording.

In addition, as shown in FIGS. 1 and 3, the multiplexer 25 may also select to output the write voltage provided by the microprocessor 15 to the refresh circuit 24. That is, after the refresh circuit 24 outputs an initial write voltage value Level_1, the control unit 22 will start counting, and will issue a power change flag Power_change_flag to the microprocessor 15 to enable it to provide a second write voltage value Level_2 for storage in the refresh circuit 24. When recording on the first interval B1 is almost completed, the control unit 22 will issue a power change pulse Power_change_pulse to cause the refresh circuit 24 to output the second write voltage value Level_2 so as to prepare for the recording on the second interval B2. After recording on the second interval B2 is started, the control unit 22 will issue another power change flag Power_change_flag to the microprocessor 15 to cause it to provide a third write voltage value Level_3 to the refresh circuit 24. The same process is repeated until recording on all of the fifteen intervals B1~B15 is completed.

Moreover, use of the write voltage values provided by the microprocessor 15 is recommended herein because it is observed that the electric current outputted by the laser diode driver 13 is not in direct proportion to the write powers generated by the laser diode 140, and is in a non-linear relationship. That is, a fixed increment change of the write voltage does not result in a fixed increment change of the laser power. Therefore, by having the microprocessor 15 provide the write voltage values, the write voltage values can be adjusted at random in accordance with the non-linear change characteristic of laser power so that the laser diode can generate write powers of equivalent changes.

Figure 5:
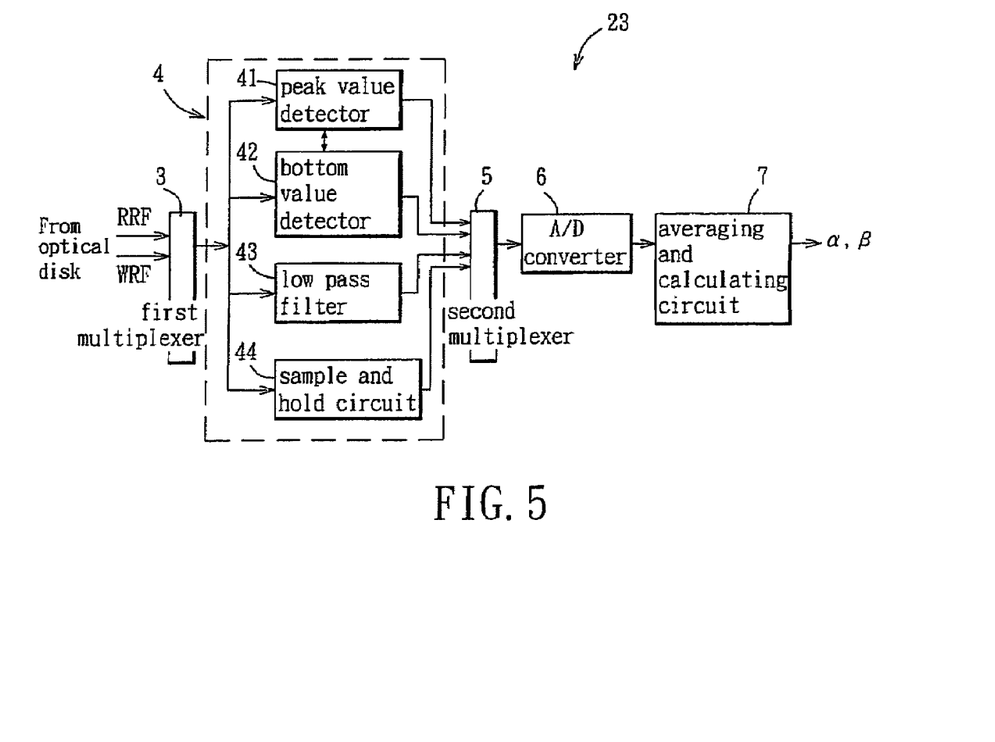
FIG. 5 is a detailed circuit block diagram of a detecting and computing unit of the preferred embodiment.

Furthermore, in step 36 as shown in FIGS. 1 and 2, when the optical read/write head 14 records data on each of the intervals B1~B15 during the OPC procedure, since the photo detector 141 will concurrently detect the WRF signal reflected back by the optical disk 8, as shown in FIG. 5, another feature of this invention is that ROPC (Running Optimum Power Control) is conducted concurrently with OPC. That is, the WRF signal is sent to the detecting and computing unit 23 for detection and computation, Furthermore, as shown in FIG. 5, in this embodiment, the detecting and computing unit 23 may be applied to an optical recording system having both OPC and ROPC, which includes a first multiplexer 3, a detection circuit 4, a second multiplexer 5, an A/D converter 6, and an averaging and calculating circuit 7. The principles on which they operate will be described hereinbelow.

The detection circuit 4 has a peak value detector 41, a bottom value detector 42, a low-pass filter 43, and a sample and hold circuit 44, which are arranged in juxtaposition and have their head and tail ends connected respectively to the first and second multiplexers 3, 5.

When the optical recording system is performing pre-recording optimum power control (OPC), the read reflected (RRF) signal generated thereby is sent to the first multiplexer 3, and the first multiplexer 3 selects to output it to the detection circuit 4.

The detection circuit 4 is connected to an output end of the first multiplexer 3 for detecting the RRF signal or WRF signal, and includes an analog peak value detector 41, an analog bottom value detector 42, a low-pass filter 43, and a sample and hold circuit 44. When the optical recording system is performing OPC, the RRF signal outputted by the first multiplexer 3 to the detection circuit 4 is sent to the analog peak value detector 41, the analog bottom value detector 42, and the low-pass filter 43, respectively, for detection of the peak value, bottom value and direct current (DC) level.

Figure 6:
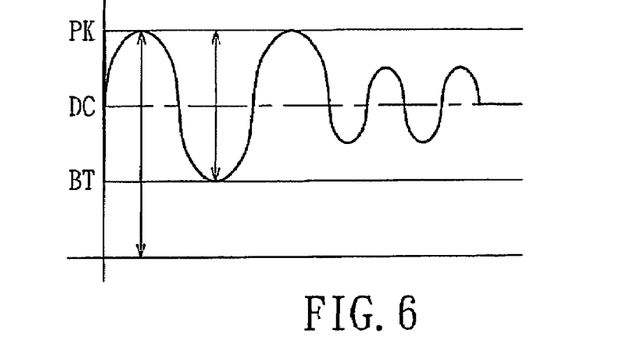
FIG. 6 is a waveform of a read reflected (RRF) signal of the preferred embodiment.
Figure 7:
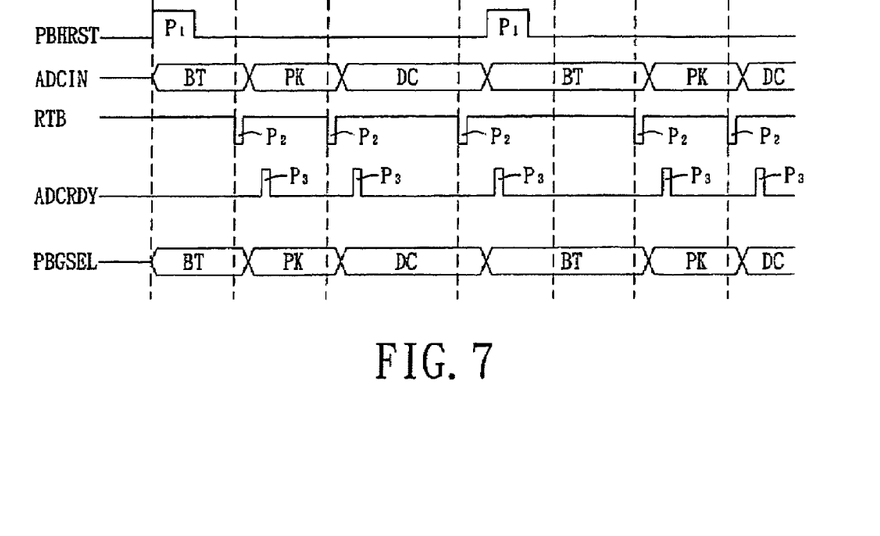
FIG. 7 shows the waveforms of PBHRST, RTB and PBGSEL control signals generated by an averaging and calculating circuit of the preferred embodiment for OPC control, the waveform of ADCIN signal outputted by a second multiplexer, and the waveform of ADCRDY control signal generated by an analog/digital conversion device.

As shown in FIG. 6, which shows the waveform of a RRF signal, prior to detection by the analog peak value detector 41 and the analog bottom value detector 42, as shown in FIGS. 5 and 7, the averaging and calculating circuit 7 will generate a first control signal PBHRST, and will reset the analog peak value detector 41 and the analog bottom value detector 42 upon appearance of a pulse P1 thereof to conduct detection anew. Thus, the analog peak value detector 41 detects the RRF signal to obtain a peak value PK; the analog bottom value detector 42 detects the RRF signal to obtain a bottom value BT; and the low-pass filter 43 effects low-pass filtering against the RRF signal and outputs a direct current level (DC) Then, the averaging and calculating circuit 7 issues a second control signal PBGSEL to control the second multiplexer 5 to enable the peak value PK, the bottom value BT and the direct current level DC outputted respectively by the analog peak detector 41, the analog bottom value detector 42, and the low-pass filter 43 to enter into the second multiplexer 5 in sequence. Thereafter, a next pulse P1 of the first control signal PBHRST will once again reset the analog peak value and bottom value detectors 41, 42 to effect detection of the RRF signal anew.

Furthermore, the second multiplexer 5 sends the received bottom value BT, peak value PK and direct current level DC (i.e., signal ADCIN) into the analog/digital converter 6 in sequence. At the same time, the averaging and calculating circuit 7 issues a third control signal RTB to the analog/digital converter 6, and a negative pulse P2 in the third control signal RTB enables the analog/digital converter 6 to reset upon each analog/digital conversion so as to perform sequential analog/digital conversion on the bottom value BT, peak value PK and direct current level DC that are received in succession. Moreover, when the analog/digital converter 6 is in the process of digitalizing the bottom value BT, the peak value PK and the direct current level DC, a fourth control signal ADCRDY is concurrently generated to send the digitalized bottom value BT, peak value PK and direct current level DC to the averaging and calculating circuit 7 in sequence.

Figure 8:
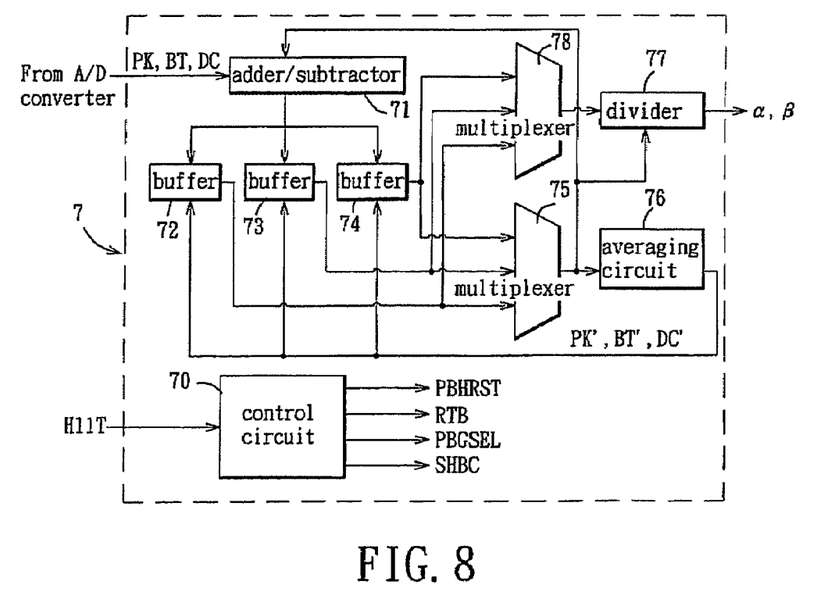
FIG. 8 is an internal circuit block diagram of the averaging and calculating circuit of the preferred embodiment.

As shown in FIG. 8, the averaging and calculating circuit 7 includes a control circuit 70 to generate the control signals PBHRST, RTE, PSGSEL and SHBC, an adder/subtractor 71, three buffers 72~74 respectively connected to the adder/subtractor 71, multiplexers 75, 78 for input by the buffers 72~74, an averaging circuit 76 connected to an output end of the multiplexer 75 and the buffers 72~74, respectively, and a divider 77 connected to the multiplexers 75, 78.

The fourth control signal ADCRDY triggers the adder/subtractor 71 through each pulse P3 so as to add up the inputted digitalized peak values PK, bottom values BT and direct current levels DC, respectively. After a certain number of addition, the added up peak values, bottom values and direct current levels are respectively stored in the buffers 72~74. Then, the multiplexer 75 will send the added-up peak values, bottom values and direct current levels one by one to the averaging circuit 76 for averaging. Additionally, in this embodiment, the averaging operation of the averaging circuit 76 is realized using a shifter. The average peak value PK', the average bottom value BT' and the average direct current level DC' are once again stored in the buffers 72~74, and are sent to the divider 77 and/or the adder/subtractor 71 by the multiplexers 75, 78 depending on requirements, for application by the adder/subtractor 71 and the divider 77.

According to a predetermined control parameter calculation formula, e.g., a calculation formula of the parameter β used in a CD-R drive: β=2β'−1, it is defined herein that β'=(PK'−DC')/(PK'−BT'). The adder/subtractor 71 may retrieve from the buffers 72~74 the average peak value PK', the average bottom value BT' and the average direct current level DC' to perform addition and subtraction, followed by a dividing operation by the divider 77, thereby obtaining the control parameter β'. Similarly, for the calculation formula of the parameter γ used in a CD-RW drive, the above calculating mechanism can also be used to obtain parameter γ.

Furthermore, an important point is that even though there are many different formulas for calculating parameters β and γ, since the averaging and calculating circuit 7 calculates using a digital method, their calculation formulas and calculation results can be changed by merely changing the process of access to the data. Therefore, the calculation method thereof can be changed flexibly with different calculation formulas.

With further reference to FIG. 5, when the optical recording system performs ROPC, the WRF signal generated thereby is selected by the multiplexer 3 for output to the detection circuit 4. At this time, the WRF signal is sent to the analog peak value detector 41 and the sample and hold circuit 44, respectively, for detection.

Figure 9:
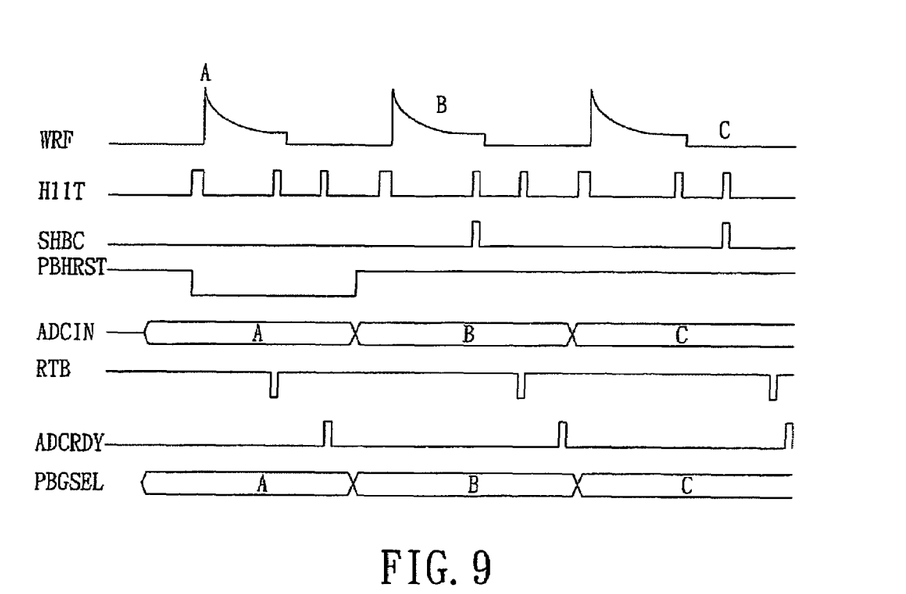
FIG. 9 shows the waveform of a write reflected signal of the preferred embodiment, and the waveforms of SHBC, PBHRST, RTB and PBGSEL control signals generated by the averaging and calculating circuit based on the H11T control signal for ROPC control, the waveform of the ADCIN signal outputted by the second multiplexer, and the waveform of the ADCRDY control signal generated by the analog/digital converter.

Furthermore, as shown in FIGS. 5 and 9, first of all, the control circuit 70 of the averaging and calculating circuit 7 is triggered by an external control signal H11T to generate a first control signal PBHRST to the analog peak value detector 41 to enable the analog peak value detector 41 to reset when the first control signal PBHRST changes from a high level to a low level, and to perform peak value detection on the write reflected signal (WRF), e.g., the first WRF signal, at a low level interval (corresponding to a WRF signal cycle) to thereby obtain a peak value A of the WRF signal. In addition, a conventional analog/digital converter 6 cannot sample the different levels of the same WRF signal under high-speed recording.

Therefore, what is done in this invention is to solely obtain the peak value A upon arrival of the first WRF signal. Then, the averaging and calculating circuit 7 generates a fifth control signal SHBC to the sample and hold circuit 44 to enable the sample and hold circuit 44 to sample the different positions of the second WRF signal and the third WRF signal that arrive successively so as to obtain a second level B and a third level C, thereby sampling the WRF signals in turn. Hence, it is unnecessary to use high-speed and expensive analog/digital converters, and the peak value A of the WRF signal can be obtained with accuracy.

At the same time, as shown in FIG. 9, the control signal PBGSEL of the averaging and calculating circuit 7 controls the peak value A, the second level B and the third level C to enter into the second multiplexer 5 in sequence. Then, the second multiplexer 5 sends the peak value A, the second level B and the third level C (i.e., signal ADCIN) to the analog/digital converter 6 in sequence.

At this time, the third control signal RTB of the averaging and calculating circuit 7 triggers the analog/digital converter 6 to reset and to digitalize the peak value A, the second level B and the third level C in sequence, and the digitalized peak value A and second and third levels B, C are then sent in sequence to the averaging and calculating circuit 7 according to the control signal ADCRDY. Based on the digitalized peak value A and second and third levels B, C, the averaging and calculating circuit 7 generates an ROPC control parameter α that is calculated in the same manner as described above, which will not be repeated herein. Certainly, the calculating method of the averaging and calculating circuit 7 may flexibly change with different calculation formulas of the control parameter α.

Therefore, by applying the working principle of the averaging and calculating circuit 7, this embodiment can simultaneously execute ROPC parameter acquisition when executing the OPC recording procedure. That is, within a power stable interval, the WRF signal is sent to both the peak value detector 41 of the detection circuit 4 and the sample and hold circuit 44 through the first multiplexer 3 so as to acquire a peak value A, a second level B and a third level C of the WRF signal. Then, the second multiplexer 5 sends the peak value A, the second level B and the third level C to the A/D converter 6 for conversion into digitalized values for subsequent transmission to the averaging and calculating circuit 7, which calculates according to a predetermined formula to obtain an ROPC control parameter α. Thus, after detection and computation by the detecting and computing unit 23, the WRF signals generated by the fifteen record intervals B1~B15 can produce fifteen ROPC control parameters α1~α15, respectively.

Figure 10:
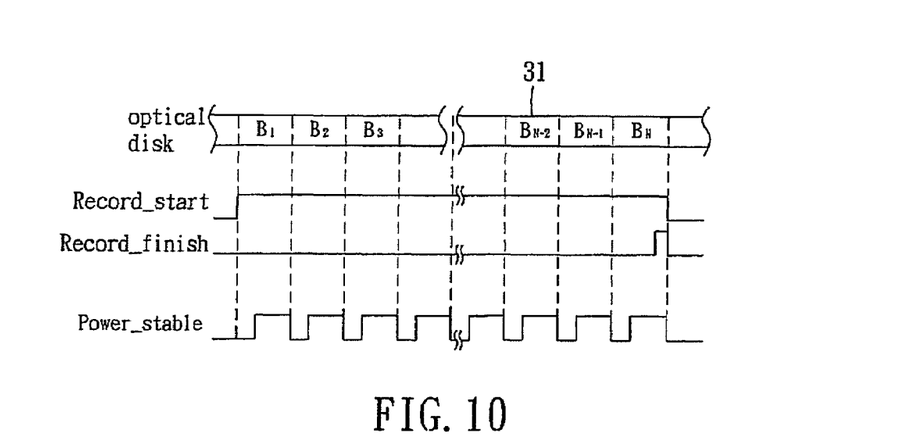
FIG. 10 is a time chart of the reading step of the OPC procedure executed by the preferred embodiment.
Figure 11:
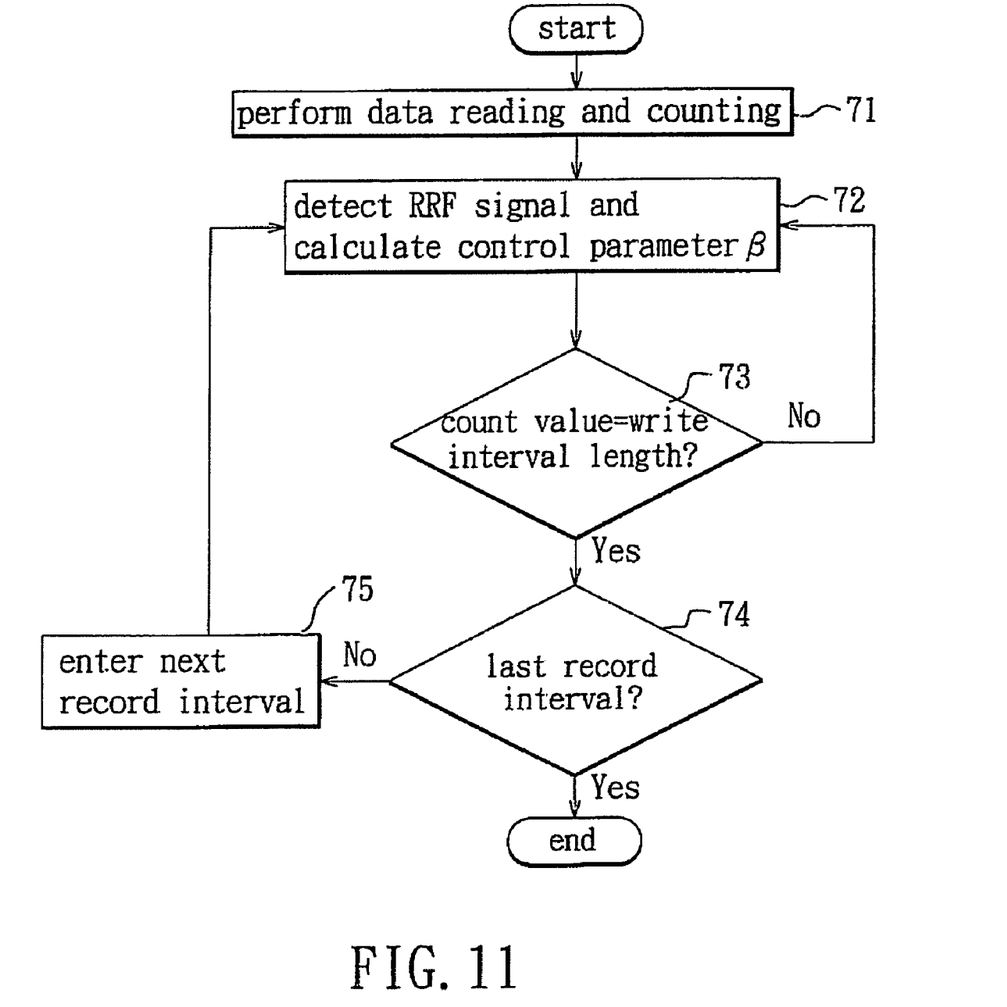
FIG. 11 is a reading flow chart of the OPC procedure executed by the preferred embodiment.

Subsequently, after the OPC procedure has completed the recording operation, the read operation of the OPC procedure is carried out. In step 71 as shown in FIG. 1, FIG. 10 and FIG. 11, initially, the CD/DVD encoder 11 likewise issues a record start signal Record_start to the control unit 22 to enable it to start counting based on the frame clock signal Frame_clock. At this time, the write voltage generating circuit 21 generates a fixed read voltage that is sent to the laser diode driver 13 through the D/A converter 28 and the automatic power controller 29 to cause the laser diode 140 of the optical read/write head 14 to issue a read power for reading data from the first interval B1 of the optical disk 8.

At the same time, in step 72 as shown in FIG. 11, the control unit 22 will, during the counting process, generate a power stable signal Power_stable based on the previously set power unstable length Power_unstable_length to trigger the detecting and computing unit 23 to detect the RRF signal (detected by the photo detector 141, the waveform thereof being shown in FIG. 6) generated by the power stable interval of the first interval B1 only. That is, as shown in FIG. 5, the RRF signal will be sent simultaneously to the peak value detector 41, the bottom value detector 42 and the low-pass filter 43 for detection and filtering so as to obtain a peak value PK, a bottom value BT and a direct current level DC of the RRF signal shown in FIG. 6. Then, the peak value PK, the bottom value BT and the direct current level DC are sent through the second multiplexer 5 to the A/D converter 6 for conversion into digitalized values, which are then sent to the averaging and calculating circuit 7 to enable it to obtain an OPC control parameter β1 according to a predetermined OPC operation.

Subsequently, after decisions are made in steps 73 and 74 as shown in FIG. 11, step 75 in FIG. 11 is executed to repeat steps 71 and 72 of FIG. 11 for the RRF signal of a next record interval B2 until detection and computation of all of the record intervals B1~B15 are completed. Therefore, after executing the aforesaid control process, the OPC control parameters β1, β2, . . . β15 of each of the record intervals B1~B15 can be obtained.

Furthermore, when the optical recording system selects one of the plurality of OPC control parameters β1, β2, . . . β15 as the optimum control parameter, in general, the one that makes the parameter values on both sides thereof appear most balanced will be selected. That is, the control parameter β7 will be selected as the optimum OPC control parameter, and an optimum write power will be determined based on the control parameter β7. In addition, since the control parameter β7 represents the optimum write power, the ROPC control parameter α7 which corresponds to the OPC control parameter β7 can be selected as the optimum reference value for the control parameter α, which is generated when ROPC is executed by the optical read/write head 14 during the process of data recording. That is, during the process of data recording, once the generated control parameter α deviates from the optimum control parameter α7, the write power can be adjusted to bring the control parameter α to approximate the control parameter α7 so as to eliminate the deviation of the control parameter α, thereby enabling the optical read/write head 14 to continue to output optimum write powers during the recording process.

It can be appreciated from the foregoing that, in this invention, by configuring the optimum write power control parameter generating apparatus 2 to replace the microprocessor 15 in executing the OPC procedure, by setting an initiate write voltage value in the refresh circuit 24 of the write voltage generating unit 21 thereof, and by setting a power increasing/decreasing value Δ in the computing device 26, as well as by pre-setting the write interval length, voltage change number, and unstable power length in the control unit 22, the control unit 22 can be used to control the write voltage generating unit 21 to automatically generate a series of different write voltages, which are transmitted through the D/A converter 28 and the automatic power controller 29 to the laser diode driver 13 to drive the optical read/write head 14 to generate a series of write powers so as to conduct recording tests on and to read from the plurality of continuous test areas of the optical disk 8, and to cause the detecting and computing unit 23 to calculate each record interval based on the RRF signal that is generated during reading so as to obtain the control parameter β. At the same time, by performing ROPC during execution of the OPC procedure to acquire the WRF signal generated by the write power for calculation by the detecting and computing unit 23 to obtain the ROPC control parameter α of each record interval, and by selecting the ROPC control parameter α that corresponds to the optimum OPC control parameter β to serve as a reference value for generating the optimum write power during data recording, the effect of continuously generating optimum write powers during the recording process can be achieved.

Additionally, during the process of recording and reading in the OPC procedure, this invention utilizes the IS same control unit 22 to perform counting of each write interval length, the unstable length in each interval, and the voltage change number, so that each record interval length can be easily counted during the reading process, and so that the detecting and computing unit 23 can accurately detect the WRF signal and the RRF signal generated by each record interval during the process of recording and reading.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An apparatus for generating control parameters for optimum write power to be used in an optical recording system to control an optical read/write head thereof to generate an optimum write laser power based on the control parameter for performing data recording on an optical recording medium, said apparatus comprising:

a write voltage generating unit connected to the optical read/write head for generating a write voltage to drive the optical read/write head to correspondingly output a write laser power;

a control unit connected to said write voltage generating unit for controlling said write voltage generating unit to generate a plurality of write voltages of different levels so as to drive the optical read/write head to generate different write laser powers for recording data on a plurality of continuous write intervals of the optical recording medium; and a detecting and computing unit which is connected to the optical read/write head, which is controlled by said control unit to detect a peak value, a first level, and a second level of a write reflected signal generated by each of the write intervals of the optical recording medium during recording for performing an arithmetic operation so as to obtain a first control parameter of each write interval, and which is controlled by said control unit to detect a peak value, a bottom value and a direct current level of a read reflected signal generated by each of the write intervals when being read for performing an arithmetic operation so as to obtain a second control parameter of each of the write intervals.

2. The apparatus for generating control parameters for optimum write power as claimed in claim 1, wherein said write voltage generating unit includes a refresh circuit and a computing device that are electrically connected, said refresh circuit having a write voltage value stored therein, said computing device computing the write voltage value and a power increasing/decreasing value pre-stored in said computing device so as to obtain a next write voltage value, said refresh circuit receiving the next write voltage value from said computing device and conducting a refreshing operation upon receipt of a power change pulse signal from said control unit.

3. The apparatus for generating control parameters for optimum write power as claimed in claim 2, wherein said write voltage generating unit further includes a 2-in 1-out multiplexer which has an input end electrically connected to said computing device and a microprocessor of the optical recording system, respectively, and an output end connected electrically to said refresh circuit, said multiplexer being controlled by a mode select signal to select one of said computing device and said microprocessor to provide the write voltage value to said refresh circuit.

4. The apparatus for generating control parameters for optimum write power as claimed in claim 3, wherein the write intervals are located in a test area of the optical recording medium, said control unit having a length of each of the write intervals predisposed therein, and calculating each of the write interval lengths based on a frame clock signal so as to timely generate the power change pulse signal.

5. The apparatus for generating control parameters for optimum write power as claimed in claim 4, wherein the frame clock signal is generated as a result of wobble signal detection of the optical recording medium by a wobble ATIP/LPP/ADIP detecting and decoding circuit of the optical recording system.

6. The apparatus for generating control parameters for optimum write power as claimed in claim 5, wherein said control unit further has a power level number and a power unstable length predisposed therein, the power level number being equivalent to a number of the write intervals and being provided for said control unit to determine whether a number of changes of the write voltage value has reached a predetermined value, the power unstable length being used to generate a power stable signal to said detecting and computing unit so as to avoid power unstable portions of the write reflected signal and the read reflected signal of each of the write intervals before proceeding with the detection.

7. The apparatus for generating control parameters for optimum write power as claimed in claim 6, wherein the power level number and the power unstable length are set by said microprocessor.

8. The apparatus for generating control parameters for optimum write power as claimed in claim 1, wherein said detecting and computing unit includes a detection circuit, an analog/digital converter, and an averaging and calculating circuit, said detection circuit being used to perform detection on one of the write reflected signal and the read reflected signal to obtain a first level, a second level and a third level, said analog/digital converter being connected to said detection circuit for analog/digital conversion of the first, second and third levels, said averaging and calculating circuit being connected to said analog/digital converter, said averaging and calculating circuit generating respective control signals to control said detection circuit and said analog/digital converter, and averaging the digitalized first, second and third levels so as to obtain an optimum power parameter based on the average first, second and third levels.

9. The apparatus for generating control parameters for optimum write power as claimed in claim 8, wherein said detection circuit is an analog detection circuit which includes an analog peak value detector, an analog bottom value detector, a low-pass filter, and a sample and hold circuit such that when the optical recording system performs pre-recording optical power control (OPC) and generates the read reflected signal, said analog peak value detector detects a highest point of the read reflected signal to obtain the first level, said analog to bottom value detector detects a lowest point of the read reflected signal to obtain the second level, and said low-pass filter performs low-pass filtering of the read reflected signal to obtain a direct current value of the read reflected signal to obtain the third level; and such that when the optical recording system performs running optical power control (ROPC) during the recording process and generates the write reflected signal, said analog peak value detector detects a peak value of the write reflected signal to obtain the first level, and said sample and hold circuit samples different positions of different signals in the write reflected signal to obtain the second level and the third level, the second level being smaller than the first level, the third level being smaller than the second level.

10. The apparatus for generating control parameters for optimum write power as claimed in claim 8, wherein said detection circuit is an analog detection circuit which includes an analog peak value detector, an analog bottom value detector and a low-pass filter such that when the optical recording system performs pre-recording optical power control (OPC) and generates the read reflected signal, the analog peak value detector detects a highest point of the read reflected signal to obtain the first level, the analog bottom value detector detects a lowest point of the read reflected signal to obtain the second level, and the low-pass filter performs low-pass filtering of the read reflected signal to obtain a direct current value of the read reflected signal so as to obtain the third level.

11. The apparatus for generating control parameters for optimum write power as claimed in claim 8, wherein said detection circuit is an analog detection circuit which includes an analog peak value detector and a sample and hold circuit such that when the optical recording system performs running optical power control during the recording process and generates the write reflected signal, said peak value detector detects a highest point of the write reflected signal to obtain the first level, and said sample and hold circuit samples different positions of different signals in the write reflected signal to obtain the second level and the third level, the second level being smaller than the first level, the third level being smaller than the second level.

12. The apparatus for generating control parameters for optimum write power as claimed in claim 9, further comprising a first multiplexer which has an input end for input of the write reflected signal and the read reflected signal, and an output end connected to said analog peak value detector, said analog bottom value detector, said low-pass filter, and said sample and hold circuit of said detection circuit, respectively.

13. The apparatus for generating control parameters for optimum write power as claimed in claim 9, further comprising a second multiplexer which is connected between said detection circuit and said analog/digital converter, said second multiplexer having an input end connected to said analog peak value detector, said analog bottom value detector, said low-pass filter, and said sample and hold circuit of said detection circuit, respectively, for input of the first, second and third levels, and which selects one of said analog peak value detector, said analog bottom value detector, said low-pass filter, and said sample and hold circuit based on a control signal from said averaging and calculating circuit so as to selectively output the first level, the second level and the third level to said analog/digital converter in turn.

14. The apparatus for generating control parameters for optimum write power as claimed in claim 9, wherein said averaging and calculating circuit is a digital averaging and calculating circuit which includes a control circuit, an adder/subtractor, three buffers, two multiplexers, an averaging circuit, and a divider, said control circuit being provided to generate different control signals to control said analog peak value detector, said analog bottom value detector, said sample and hold circuit, said second multiplexer, and said analog/digital converter, said adder/subtractor adding up the digitalized first, second and third levels, respectively, said buffers being provided to store the added-up first, second and third levels temporarily, said multiplexers being connected to said buffers for sending the added-up first, second and third levels to said averaging circuit or said divider for computation, said averaging circuit storing the average first, second and third levels back into said buffers for access by said adder/subtractor which performs addition and subtraction operations before storing back thereto, and for access by said divider which, after computation, generates the optimum power parameter.

15. The apparatus for generating control parameters for optimum write power as claimed in claim 9, wherein when the optical recording system performs pre-recording optical power control (OPC), the first, second and third levels detected by said detection circuit are the peak value, the bottom value, and the direct current value of the read reflected signal, respectively, and when the optical recording system performs running optical power control (ROPC), the first, second and third levels detected by said detection circuit are the peak value, the second level, and the third level of the write reflected signal, respectively.

16. A method for generating control parameters for optimum write power for use in an optical recording system which controls an optical read/write head thereof to generate an optimum write laser power based on the control parameters so as to perform data recording on an optical recording medium, the method comprising:
(a) generating in sequence a plurality of write voltages of different levels to drive the optical read/write head to generate different write laser powers so as to record data on a plurality of continuous write intervals of the optical recording medium in sequence;
(b) during recording of each of the write intervals, detecting a peak value, a first level and a second level of a write reflected signal generated by each of the write intervals and performing an arithmetic operation so as to obtain a first control parameter of each of the write intervals; and
(c) reading the write intervals in sequence, and after detecting a peak value, a bottom value, and a direct current level of a read reflected signal generated by each of the write intervals when being read, performing an arithmetic operation so as to obtain a second control parameter of each of the write intervals 17. The method for generating a control parameter of optimum write power control as claimed in claim 16, wherein, in step (a), the write voltages are controlled by a power change pulse signal to be generated in a progressively increasing or decreasing manner.

18. The method for generating a control parameter of optimum write power control as claimed in claim 16, wherein the write intervals are located in a test area of the optical recording medium and each have a predetermined write interval length, each write interval length being counted based on a frame clock signal in step (a) so as to timely generate the power change pulse signal.

19. The method for generating a control parameter of optimum write power control as claimed in claim 18, wherein the frame clock signal is generated as a result of wobble signal detection of the optical recording medium by a wobble ATIP/LPP/ADIP detecting and decoding circuit of the optical recording system.

20. The method for generating a control parameter of optimum write power control as claimed in claim 19, wherein, in step (a), a power level number and a power unstable length are further predisposed, the power level number being equivalent to a number of the write intervals and being used to determine whether a number of changes of the write voltages has reached a predetermined value, the power unstable length being used to generate a power stable signal to control step (b) and step (c) to avoid power unstable portions of the write reflected signal and the read reflected signal of each of the write intervals before proceeding with detection.

* * * * *